United States Patent [19]
Plantan et al.

[11] Patent Number: 5,775,202
[45] Date of Patent: Jul. 7, 1998

[54] DEFORMED CLAMP BAND MADE FROM CONTINUOUS ROLL

[75] Inventors: Ronald S. Plantan, Charlotte; Graydon Choinski, Harrisburg, both of N.C.

[73] Assignee: Indian Head Industries, Inc., Charlotte, N.C.

[21] Appl. No.: 670,403

[22] Filed: Jun. 25, 1996

[51] Int. Cl.⁶ .................. F16J 3/02; F16D 65/00
[52] U.S. Cl. ........................... 92/98 R; 92/128
[58] Field of Search ............... 92/98 R, 101, 92/128, 169.1

[56] References Cited

U.S. PATENT DOCUMENTS

| | | | |
|---|---|---|---|
| 470,985 | 3/1892 | Clarke | 29/417 |
| 1,642,472 | 9/1927 | Wentworth | 29/417 |
| 1,727,184 | 9/1929 | Thompson | 29/417 |
| 2,444,463 | 7/1948 | Nordquist | 29/417 |
| 2,534,497 | 12/1950 | Albright | 92/98 R |
| 2,643,446 | 6/1953 | Matthysse et al. | 29/417 |
| 2,724,410 | 11/1955 | Vorech | 92/101 |
| 3,020,631 | 2/1962 | Kennedy | 29/417 |
| 3,188,867 | 6/1965 | Freismuth | 92/98 R |
| 5,193,432 | 3/1993 | Smith | 92/63 |
| 5,540,568 | 7/1996 | Rosen et al. | 92/98 R |

*Primary Examiner*—Sheldon Richter
*Attorney, Agent, or Firm*—Howard & Howard

[57] ABSTRACT

A brake actuator includes an inelastically deformed separate clamp band holding the brake actuator housing portions together. The actuator is formed by cutting the clamp band from a roll of thin stainless steel. The cut portions are formed to have an L shaped section. The short L end is then placed on one of the flanges of the brake actuator housing members. The other end of the clamp band is then deformed inwardly to secure the brake actuator housings together. The invention results in a relatively low cost clamp band. The clamp band has particular application on the service side of the spring brake actuator, although it would also be useful on the emergency side.

3 Claims, 2 Drawing Sheets

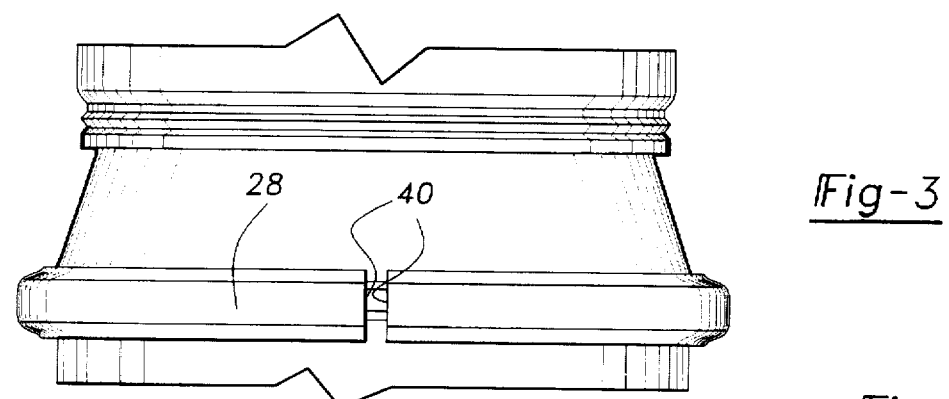
Fig-3
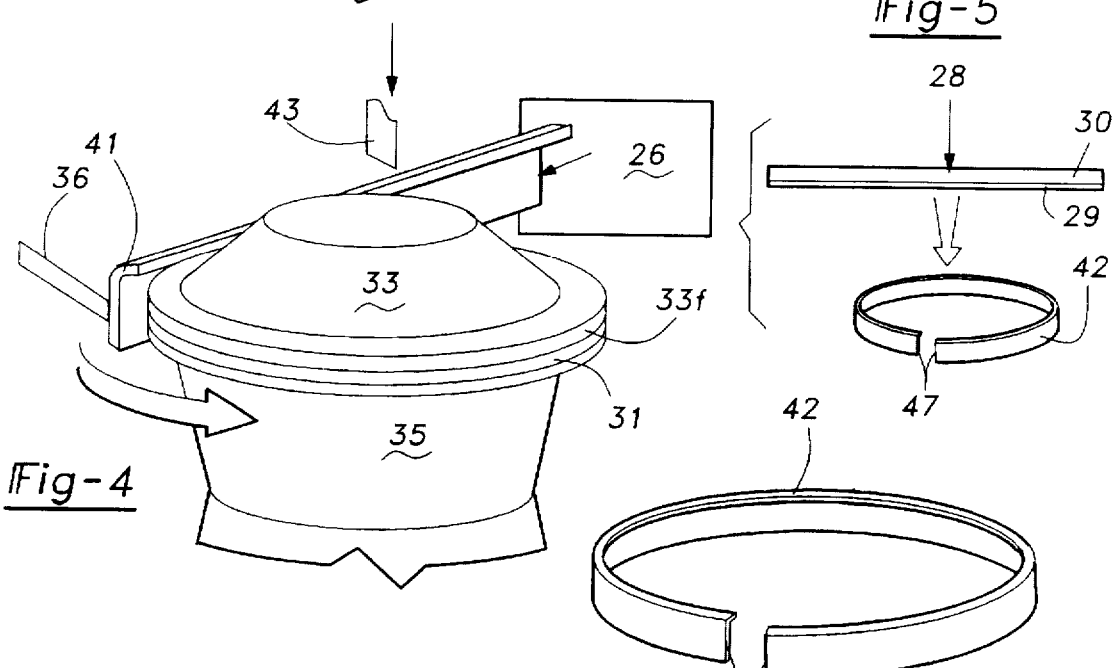
Fig-4
Fig-5
Fig-6
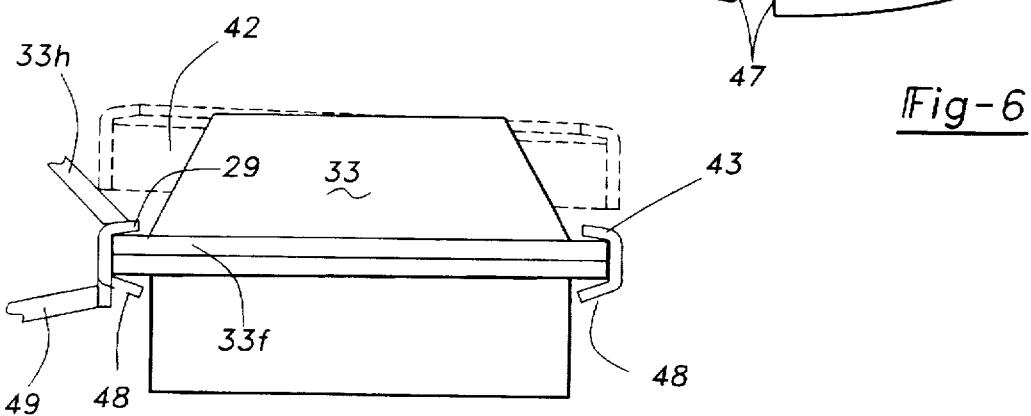
Fig-7

DEFORMED CLAMP BAND MADE FROM CONTINUOUS ROLL

BACKGROUND OF THE INVENTION

This invention relates to a method of making a low cost deformed clamping band that has particular application in spring brake actuators.

Spring brake actuators are utilized to actuate brakes on heavy vehicles with the assistance of air pressure. In known spring brake actuators, there are two chambers. In a first "service" chamber, air pressure actuates a diaphragm downwardly to move a rod which is connected to set a brake. In a second "emergency" chamber, a powerful spring is retained in place by air pressure. Should the air pressure ever fail, such that the vehicle will not have any air pressure to assist braking, the power spring moves its own actuating rod to set the brake. In the past, clamp bands have secured three housing members together to define the two chambers. Typically, diaphragms have been squeezed between mating housing members and held in place by bolted clamp bands.

More recently, the bolted clamp bands have been eliminated on the emergency side of the brake actuator. There had been some inadvertent removal of the bolted clamp bands. Thus, the industry has almost universally accepted a deformed integral housing members. Alternatively, a smaller percentage of brake actuators have used one piece drawn clamps which are deformed inelastically to hold the two housing members together.

Separate clamp members also have potential application on the service side chamber. The prior art, drawn separate clamp bands have been relatively expensive, and thus they have not been widely utilized.

SUMMARY OF THE INVENTION

In a disclosed embodiment of this invention, a sheet of coil strip steel is formed into an L-shape, and cut to the approximate length necessary to surround the circumference of the brake actuator. The strip is inelastically deformed in place to hold the housing members together on the spring brake actuator, squeezing the diaphragm and providing a seal. The use of the coil material allows stainless steel to be utilized, which is relatively inexpensive compared to drawn materials. In addition, in the prior art, complex and expensive finishing steps have been required after the ring has been deformed. The strip material utilized in this invention can be pre-treated, and thus provides a significant savings in assembly cost and time.

In a particular embodiment of the present invention, the coil material is initially cut to length. The cut lengths are then passed through a die forming station, where one lateral edge is bent into an essentially "L"-shape. The strip is then placed in a machine which holds the L on a flange formed on one of the brake actuator housing members. Either the strip or the brake actuator is rotated, and a deforming tool deforms the other lateral edge of the clamp radially inwardly such that it secures two housing members together. As an alternative to this method, the strip material may have its L-shape formed prior to being cut to length. The strip material may also approach the brake actuator deforming station, be deformed, and cut to length after its lead end has already begun to be deformed. This method may simplify handling of the parts in some applications.

In a third embodiment, after the L-shape is formed, the ring may be formed into a slight helix member. That slight helix clamp band may then be placed onto the brake actuator, and its L-end held in place on one housing member. A deforming tool may then be brought in, and either the tool or the brake may be rotated such that the clamp is deformed radially inwardly about the circumference of the brake actuator.

In any of the above described embodiments, there will result a slight gap between the two ends of the clamp band. The gap is preferably kept small such that no leakage results.

These and other features of the present invention will be best understood from the following specification and drawings, of which the following is a brief description.

BRIEF DESCRIPTION OF THE DRAWINGS

FIG. 3 shows the final brake actuator.

FIG. 4 shows an alternative method.

FIG. 5 shows yet another alternative method.

FIG. 6 shows the clamp ring formed by the alternative method of FIG. 5.

FIG. 7 shows a step subsequent to FIG. 5, using the clamp embodiment of FIG. 6.

DETAILED DESCRIPTION OF THE PREFERRED EMBODIMENT

Figure 1:
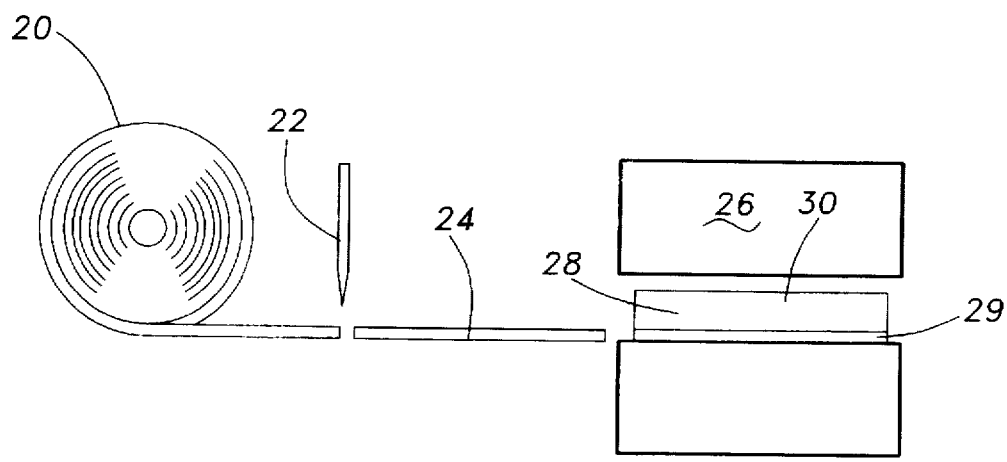
FIG. 1 is a schematic view of a method of forming a clamp band for a spring brake actuator according to the present invention.

As shown in FIG. 1, a roll of strip steel 20 may pass through a cutting tool 22 which cuts the strips 24 into desired lengths. The lengths are determined by the required circumference of the spring brake actuator that is to receive the clamp band. The lengths 24 may then pass through a die forming station 26 (shown schematically), wherein a clamp band preform 28 is formed having an L back 30, and an L bent end 29.

Figure 2:
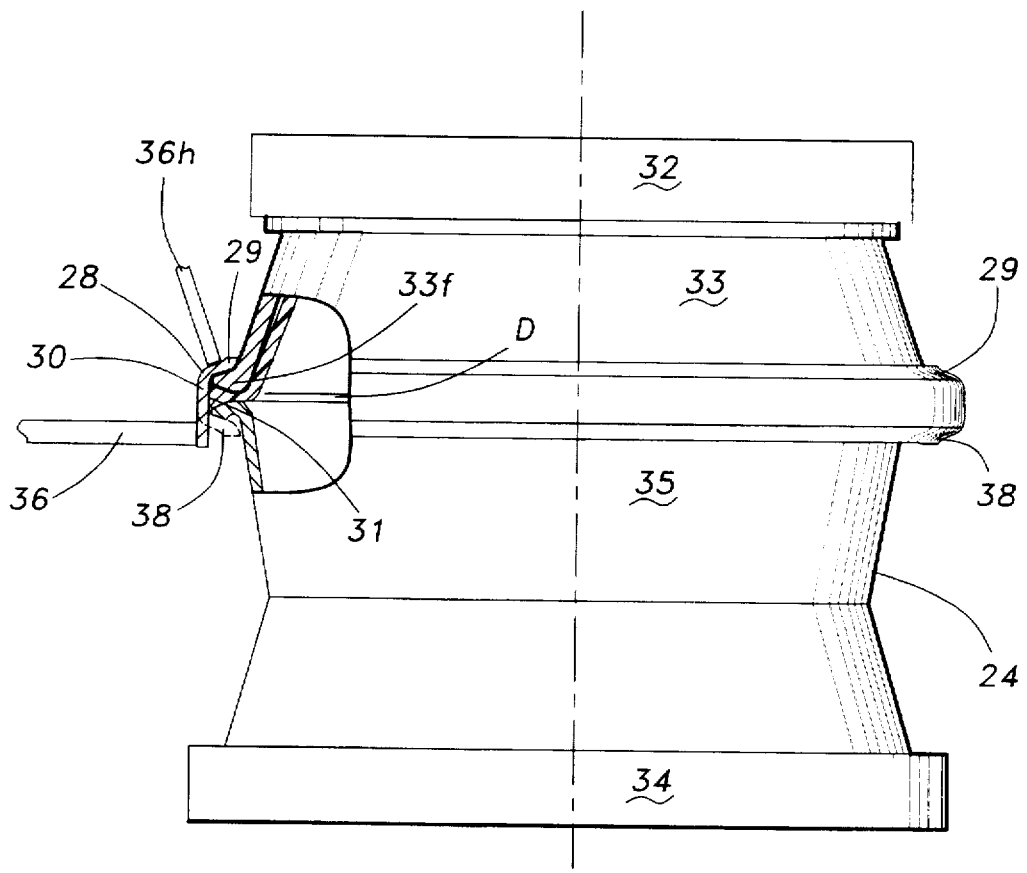
FIG. 2 shows a subsequent step in the formation of the brake actuator.

As shown in FIG. 2, in a first embodiment, clamping planten 32 and 34, shown schematically, hold brake actuator housing members 33 and 35 together. Note that housing members 33 and 35 are shown rather schematically for purposes of this application. There is no inventive structure within the brake actuator. Note diaphragm 31 is squeezed between the housing members 33 and 35. Housing member 35 is illustrated to be the central housing member of a dual-diaphragm brake actuator that is typically known as the flange case. The housing member 33 might either be the spring chamber housing or the service chamber housing. Again, this structure is shown somewhat schematically.

As shown, the strip 28 is placed with its L end 29 resting on one of the flanges of one of the housing members 33 or 35. A tool 36h holds that end 29 downwardly on the flange 33f. A second deforming tool 36 is utilized in a roll forming operation to deform the other end 38 of the strip 28 to the position shown in phantom in FIG. 2 on the left hand side, and in sold line on the right hand side. As is known, the entire brake actuator structure rotates or tool 36 rotates, and the deformation occurs along the circumference of the brake during this rotation.

As shown in FIG. 3, the end result is that the clamp band 28 is deformed and has two axial ends 40 which are slightly spaced. The amount of spacing is exaggerated in FIG. 3 to show its existence. This spacing is kept to be relatively small such that leakage does not occur between the housing members.

FIG. 4 shows an alternative method, wherein the strip material 20 is formed by the die forming station 26 to have its L shape prior to being cut. The strip material 41 is then sent continuously to the deforming tool 36, and is cut as it is being deformed onto the brake actuator to the desired length by tool 43.

Other alternative variations of these basic methods may be utilized. As an example, the cutting by tool 22 could occur after the die forming station 26. Further, as shown in FIG. 4, the cutting could occur much later, as the strip is being deformed to the brake actuator.

An alternative is shown in FIG. 5, a clamp ring 42 is formed by bending the preform 28 into a slight helix. As shown, the ends 47 of the helix are spaced slightly axially along the central axis of the ring 42. This results in greater holding strength for the clamp as it is deformed onto the brake actuator. It is known in prior clamp rings to utilize a helix. Those prior clamp rings were bolted-type clamp rings, and not the deformed-type of clamp ring utilized in this invention.

As shown in FIG. 6, the clamp ring thus has a helix shape with its spaced ends 47. The circumference is chosen to be slightly smaller than would be required to fully surround the brake actuator.

As shown in FIG. 7, the ring 42 is brought downwardly onto one of the brake actuator housings 33, and in particular, to rest on the flange 33f. A holding tool 36h again holds the band on the brake actuator. The deforming tool 49 then deforms the end 48 radially inwardly such that the resulting structure is as shown on the right hand side of FIG. 7.

In summary, the present invention discloses a low cost alternative for forming deformed clamp bands on spring brake actuators. The clamp bands may be formed of stainless steel, and do not require substantial subsequent work after deformation. Moreover, the relatively low cost stainless steel provides a very inexpensive method for forming the clamp bands when compared to the prior art drawn clamp bands.

As an alternative to stainless steel, SAE 1010 steel having a known protective coating may be used.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A brake actuator comprising:
   1) a first housing member having a flange circumferentially encircling said first housing member at a radially outer surface;
   2) a second housing member having a flange circumferentially encircling said second housing member generally corresponding to said flange on said first housing member;
   3) a diaphragm received between said flanges on said first and second housing members, said diaphragm having a radially outer portion compressed and sealed by said flanges; and
   4) an inelastically deformed clamp band received on said flanges, said clamp band being separate from either of said flanges, said clamp band being generally C-shaped in cross section, and having lateral ends inelastically deformed radially inwardly into contact with said flanges, said lateral ends being inelastically deformed in place into contact on said flanges to underlie said flanges on both said first and second housings, and said clamp band having two axial ends spaced circumferentially by a small amount, said lateral ends being unsecured to each other.

2. A brake actuator as recited in claim 1, wherein one of said first and second housing members is a service chamber housing for a brake actuator.

3. A brake actuator comprising:
   1) a first housing member having a flange at a radially outer surface;
   2) a second housing member having a flange generally corresponding to said flange on said first housing member;
   3) a diaphragm received between said flanges on said first and second housing members, said diaphragm having a radially outer portion compressed and sealed by said flanges;
   4) an inelastically deformed clamp band received on said flanges, said clamp band being separate from either of said flanges, said clamp band being generally C-shaped in cross section, and having lateral ends inelastically deformed radially inwardly to underlie said flanges on both said first and second housings, and said clamp band having two axial ends spaced circumferentially by a small amount; and
   5) said clamp band has a slight helical shape prior to being deformed on said flanges.

* * * * *